(12) United States Patent
Weissbacher (10) Patent No.: US 6,966,700 B2
(45) Date of Patent: Nov. 22, 2005

(54) HYDRODYNAMIC PLAIN BEARING AND METHOD OF LUBRICATING AND COOLING THE BEARING

(75) Inventor: Georg Weissbacher, Alpen (DE)

(73) Assignee: Gleitlagertechnik Weissbacher GmbH, Alpen (DE)

(*) Notice: Subject to any disclaimer, the term of this patent is extended or adjusted under 35 U.S.C. 154(b) by 235 days.

(21) Appl. No.: 10/313,443

(22) Filed: Dec. 6, 2002

(65) Prior Publication Data

US 2003/0081867 A1    May 1, 2003

Related U.S. Application Data

(63) Continuation-in-part of application No. 09/888,239, filed on Jun. 22, 2001, now abandoned.

(30) Foreign Application Priority Data

Jun. 23, 2000  (DE) ............................... 100 30 698
Dec. 11, 2001  (DE) ............................... 101 60 804

(51) Int. Cl.⁷ ............................................. F16C 32/00
(52) U.S. Cl. .................... 384/313; 384/316; 384/322; 384/398
(58) Field of Search ........................... 384/100, 313, 384/316, 322, 397, 398, 399, 400

(56) References Cited

U.S. PATENT DOCUMENTS

| | | | |
|---|---|---|---|
| 2,697,017 A | 12/1954 | Evans | |
| 3,680,932 A * | 8/1972 | Raimondi | 384/291 |
| 3,784,266 A | 1/1974 | Parlevliet | |
| 4,474,483 A * | 10/1984 | Suzuki et al. | 384/114 |
| 4,764,034 A * | 8/1988 | Fust et al. | 384/100 |
| 5,456,535 A * | 10/1995 | Chen et al. | 384/398 |
| 5,480,234 A * | 1/1996 | Chen et al. | 384/313 |

FOREIGN PATENT DOCUMENTS

| | | |
|---|---|---|
| DE | 2 408 938 | 10/1974 |
| DE | 38 25 449 | 6/1989 |
| DE | 101 60 804 | 10/2002 |
| EP | 0 068 103 | 4/1982 |
| JP | 58 166 127 | 1/1983 |
| JP | 58-166127 | * 10/1983 |

* cited by examiner

Primary Examiner—William C. Joyce
(74) Attorney, Agent, or Firm—Collard & Roe, P.C.

(57) ABSTRACT

A method of lubricating and cooling a hydrodynamic plain bearing for a rotating element comprises the steps of supplying fresh, cold lubricant under pressure from a pressure chamber arranged upstream of a fixed gliding plane to a lubricating gap between the fixed gliding plane and the rotating element, the supply of fresh, cold lubricant being so controlled that an effective lubricating wedge is formed between the rotating element and the fixed gliding plane. The pressure chamber is connected to a decompression chamber predominantly filled with gas and arranged upstream of the pressure chamber by a mixing conduit, used, hot lubricant adhering to the rotating element is moved to the decompression chamber, and a portion of the used, hot lubricant is removed from the decompression chamber while the remaining portion of the used, hot lubricant flows from the decompression chamber into the mixing conduit and is mixed with fresh, cold lubricant flowing countercurrently in the mixing conduit whence the mixture is pressed into the decompression chamber.

16 Claims, 8 Drawing Sheets

FIG. 12

HYDRODYNAMIC PLAIN BEARING AND METHOD OF LUBRICATING AND COOLING THE BEARING

CROSS-REFERENCE TO RELATED APPLICATION

This is a continuation-in-part of my U.S. patent application Ser. No. 09/888,239, filed Jun. 22, 2001 now abandoned.

BACKGROUND OF THE INVENTION

1. Field of the Invention

The present invention relates to a method of lubricating and cooling a hydrodynamic plain bearing for a rotating element, which bearing has at least one fixed gliding plane, and a pressure chamber and a decompression chamber are arranged upstream of the gliding plane, wherein a fresh, cold lubricant is supplied under pressure from the pressure chamber to a lubricating gap between the rotating element and the fixed gliding plane at an entry end, the lubricant supply being so controlled that a sufficient lubrication wedge is created between the rotating element and the gliding plane, and used, hot lubricant is removed therefrom at a discharge end of the gliding plane and is conducted from the lubricating gap into the decompression chamber, any hot lubricant adhering to the rotating element being partially moved into the decompression chamber and fresh, cold lubricant being supplied under pressure from the pressure chamber in a subsequent lubricating gap.

This invention also relates to a plain bearing with fixed gliding surfaces for a rotating element, such as a cylindrical shaft or a pressure disc, with means for supplying the fresh, cool lubricant under pressure.

The invention deals with plain bearings for rotating elements gliding in the bearing at high speeds, such as gas and steam turbines, turbo-compressors and turbo-gears connected therewith. The plain bearings of the present invention are designed for rotating elements gliding at high speeds in the bearings, in a chamber filled predominantly with gas, for example a gearbox or bearing box of a turbo engine filled predominantly with gas.

2. Description of the Prior Art

Figure 1:
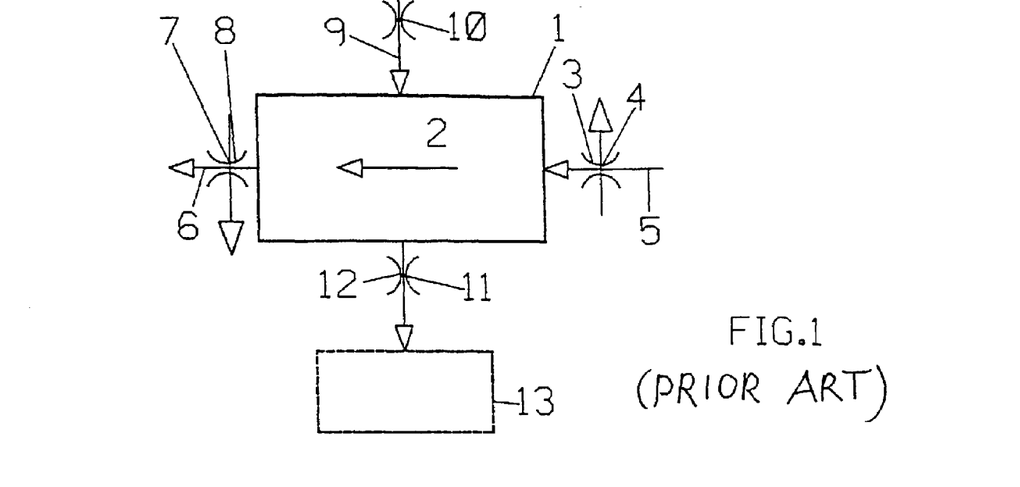
Figure 2:
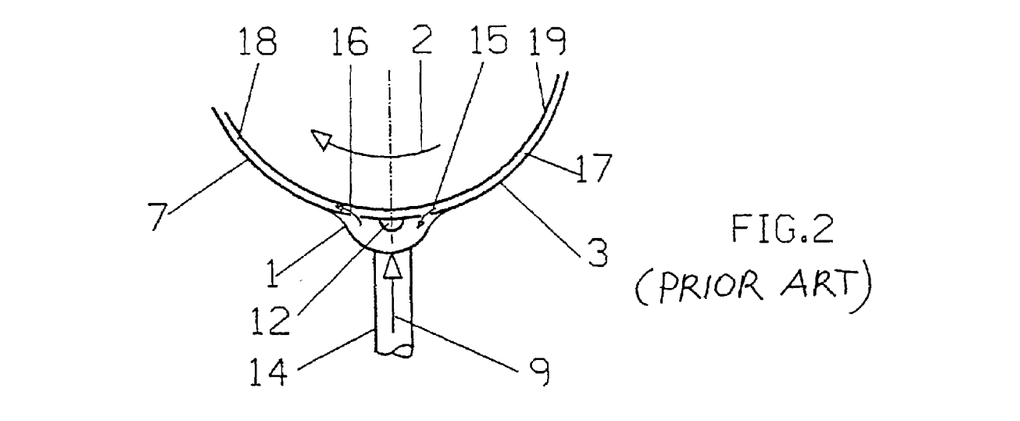
FIG. 2 is a simplified illustration of a prior art bearing lubricated by such a method.

It is known from U.S. Pat. No. 3,680,932, particularly FIG. 12, to provide a hydrodynamic journal bearing for large machines, such as turbines and generators. The load-bearing lower part of the bearing extends over and angle of about 160°. The upper half of the bearing is not subjected to any load, and there is a half-moon-shaped space between the shaft and the inner surface of the bearing. This bearing has three gliding segments arranged between two grooves associated with each gliding segment. In this arrangement, the foremost groove, in the direction of rotation of the shaft, constitutes the pressure groove and the groove at the end of the gliding segment constitutes the decompression chamber. Fresh lubricant is pressed under pressure from the pressure groove into the space between the rotating shaft and the gliding segment and is taken along by the rotating shaft to the decompression groove. The used, hot lubricant is removed from the decompression groove. The pressure groove of the gliding segment downstream of the decompression chamber, in the direction of rotation of the shaft, is spaced from the preceding decompression chamber, the spacing being sufficient to prevent lubricant from the pressure groove to flow into the adjacent decompression chamber. The pressure and decompression grooves are flat and fully filled with lubricant. Therefore, the entire inner surface of the bearing is filled with lubricant, i.e. all the pockets and grooves of the bearing. In such a flooded bearing, the lubricant exchange proceeds in a mixing chamber, as is shown in accompanying FIGS. 1 and 2 illustrating the state of the art.

The journal bearing disclosed in this patent is completely covered by the lubricant and has a relatively high loss factor, the losses of such lubricated bearings rising with proportionally with the surface covered by the lubricant.

Known bearings for shafts rotating at high speeds include the offset-half structure, the double-offset structure, the hybrid bearing, the so-called lemon play bearing, the multiple-plane bearing with two to five sliding planes, and the axial bearing with wedge planes for one or two rotational directions.

In the offset-half bearing structure, an upper gliding plane is offset horizontally from a lower gliding plane by a predetermined distance so that the shaft circumference contacts the bearing along two different lines. The two gliding planes are coaxially offset relative to each other and to the axis of the shaft. In the double-offset bearing structure, the two gliding planes are offset relative to each other horizontally as well as vertically. In both structures, the lubricating gap forms a wedge tapering in the direction of rotation of the shaft.

In the hybrid bearing, a lower fixed gliding plane is combined with an oppositely positioned pivotal gliding plane.

The so-called lemon play bearing is a variation of the multiple-plane bearing.

SUMMARY OF THE INVENTION

It is the primary object of this invention to overcome the indicated disadvantages while providing a structurally relatively simple bearing with at least one fixed gliding plane, and to reduce the losses and consumption of lubricant very substantially while assuring a relatively high load capacity and largely or completely eliminating vibrations.

According to one aspect of the invention, this object is accomplished with a method of lubricating and cooling a hydrodynamic plain bearing for a rotating element, which bearing has at least one fixed gliding plane, which comprises the steps of supplying fresh, cold lubricant under pressure from a pressure chamber arranged upstream of the gliding plane to a lubricating gap between the fixed gliding plane and the rotating element, where the rotating element glides on the gliding plane, the supply of fresh, cold lubricant being so controlled that an effective lubricating wedge is formed between the rotating element and the fixed gliding plane, connecting the pressure chamber and a decompression chamber filled predominantly with gas and arranged upstream of the gliding plane by a mixing conduit, moving used, hot lubricant adhering to the rotating element to the decompression chamber, and removing a portion of the used, hot lubricant from the decompression chamber while the remaining portion of the used, hot lubricant flows from the decompression chamber into the mixing conduit and is mixed with fresh, cold lubricant flowing countercurrently in the mixing conduit whence the mixture is pressed into the decompression chamber.

According to this invention, the known one-stage lubricant exchange in the lubricant pockets arranged between successive gliding planes is replaced by a highly effective and accurately controllable three-stage process. In a first stage, a portion of the used, hot lubricant adhering to the rotating element is removed to the decompression chamber. In a second stage, the remaining portion of the used, hot lubricant adhering to the rotating element is mixed with the countercurrently flowing fresh, cold lubricant in the mixing conduit and is pressed into the decompression chamber. In a third stage, finally, fresh, cold lubricant is supplied under pressure from a pressure chamber to a downstream lubricating gap between the fixed gliding plane and the rotating element.

With this method, losses are reduced up to about 50% while the bearing temperature is reduced by several Kelvin (K).

According to another aspect of the present invention, the indicated object is accomplished with a plain bearing for a rotating element, which comprises at least one fixed gliding plane, means for supplying a fresh, cold lubricant under pressure to the plain bearing, and means for removing used, hot lubricant from the plain bearing. The lubricant supplying and removing means comprise a pressure chamber upstream of the fixed gliding plane in a direction of rotation of the rotating element, a decompression chamber predominantly filled with gas upstream of the pressure chamber in the direction of rotation, a mixing conduit connecting the pressure and decompression chambers, and a bore connecting the pressure chamber to a supply of lubricant under pressure.

In such a bearing, the individual gliding planes may be so dimensioned that they are adapted to the loads to which they are subjected, which substantially reduces the losses and the lubricant consumption, particularly in bearings for shafts or pressure discs rotating at speeds of more than 50 meters/second. The plain bearing may be a radial bearing, an axial bearing, or a pivot bearing comprising the fixed gliding plane and at least two pivoted segments.

The term "predominantly filled with gas" means the following: if the gas were removed from the content of the decompression chamber, which consists of gas and lubricant, the volume of the resultant lubricant is smaller than half the volume of the decompression chamber.

Tests have shown that replacing a conventional offset-half bearing structure with a plain bearing according to the invention leads to reducing the losses by more than 50% while simultaneously reducing the bearing temperature by several Kelvin.

Operating at a circumferential speed of about 90 m/s produced a reduction of the losses from 225 kW to 110 kW and of the lubricant consumption from about 380 liter/minute to about 210 l/m, with a shaft having a diameter of about 290 mm and a bearing length of about 290 mm.

In the bearing of the invention, the means for supplying the lubricant is independent of the means for removing the lubricant.

In the bearing of the present invention, the bearing surface areas covered by the lubricant are held to a minimum. Therefore, the surfaces of the decompression chamber heretofore covered by lubricant are covered by gas. This drastically reduces the loss factor.

To fill the decompression chamber predominantly with gas also during operation, the following steps may be taken, single or in combination:

The cross section of the decompression chamber is as large as possible.

The gas pressure in the bearing is reduced so that no lubricant-air mixture (foam) is formed.

A gas pressure may be built up in the axial direction in the decompression chamber, which produced an axial gas flow in the decompression chamber.

The gas may be air, air at a reduced pressure coming from a partial vacuum, and/or helium. Since the decompression chamber is connected with the tank pressure-less by the chamber surrounding the bearing, the decompression chamber receives the gas filling the surrounding chamber.

BRIEF DESCRIPTION OF THE DRAWING

The above and other objects, advantages and features of the present invention will become more apparent from the following detailed description of certain preferred embodiments thereof, taken in conjunction with the accompanying drawing wherein FIG. 1 diagrammatically illustrates a prior art lubricating method.

DETAILED DESCRIPTION OF THE PREFERRED EMBODIMENTS

To avoid redundancy in the description, like parts operating in a like manner have been designated by the same reference numerals in all figures of the drawing.

Referring first to FIGS. 1 and 2 schematically illustrating the prior art, shaft 19 rotates in a direction of rotation indicated by arrow 2, gliding past upstream gliding plane 3, as seen in the direction of rotation, and downstream gliding plane 7 of a plan bearing. The gliding planes and the circumference of shaft 19 define throttles 4 and 8 therebetween. Used, hot lubricant flows in the direction of arrow 5 through throttle 4 into lubricant pocket 1 to which fresh, cold lubricant is supplied under pressure in a direction indicated by arrow 9 through conduit 14 constituting a throttle 10. The used and the fresh lubricants are mixed in the lubricant pocket, and a portion of this mixture flows out of the lubricant pocket in the direction indicated by arrow 6 towards downstream gliding plane 7 which defines throttle 8 with the circumference of shaft 19. At the same time, another lubricant mixture portion flows out of lubricant pocket 1 through a side opening 12 into tank 13. Lubricant wedges 17 and 18 are formed between gliding planes 3 and 7, respectively, and shaft 19.

Figure 3:
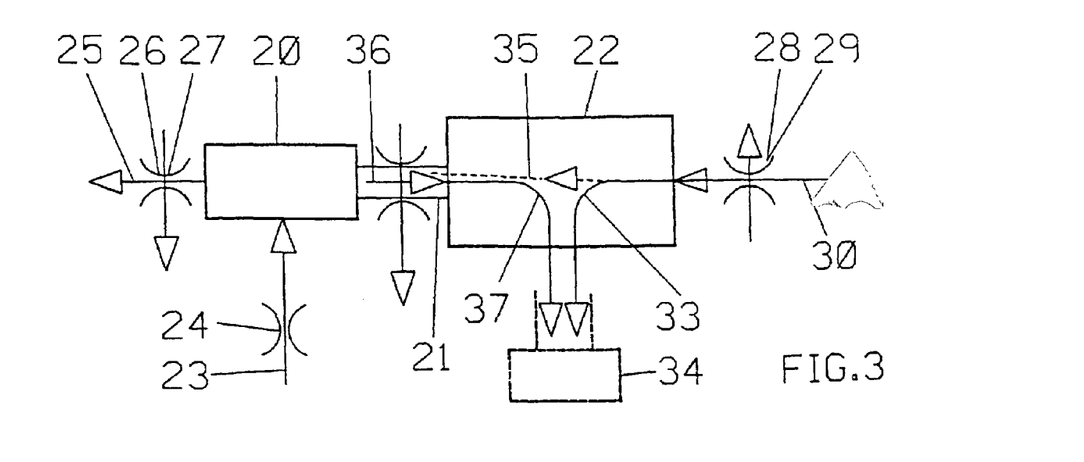
FIG. 3 diagrammatically illustrates a lubricating method according to this invention.

Similarly to FIG. 1, FIG. 3 diagrammatically illustrates the method of lubricating and cooling a hydrodynamic plain bearing for a rotating element, according to the present invention. The bearing has two fixed gliding planes 26, 28 which define adjustable apertures or lubricating gaps 27 and 29 with the circumference of the shaft rotating in the bearing. Fresh, cold lubricant is supplied under pressure in the direction of arrow 25 from a pressure chamber 20 arranged upstream of gliding plane 26 to lubricating gap 27 between fixed gliding plane 26 and the rotating shaft, where the rotating shaft glides on the gliding plane. The supply of fresh, cold lubricant to pressure chamber 20 in the direction of arrow 23 is so controlled by a throttle valve 24 that an effective lubricating wedge is formed between the rotating shaft and fixed gliding plane 26. Pressure chamber 20 is connected to a decompression chamber 22 arranged upstream of gliding plane 26 by a mixing conduit 21, which defines an adjustable aperture with the circumference of the rotating shaft. At the end of gliding plane 28, used, hot lubricant adhering to the rotating shaft flows in the direction of arrow 30 from upstream lubricating gap 29 into decompression chamber 22. A portion of the used, hot lubricant is removed from the decompression chamber in the direction of arrow 33 into tank 34 while the remaining portion of the used, hot lubricant flows in the direction of arrow 35 into mixing conduit 21 where it is mixed with the fresh, cold lubricant flowing countercurrently in the direction of arrow 36 in the mixing conduit and is pressed into the decompression chamber whence this mixture is removed to tank 34 in the direction of arrow 37.

The decompression chamber is predominantly filled with gas. It may also be desirable to exhaust the lubricant removed from the lubricating gap through the mixing conduit into the decompression chamber, or to remove the lubricant removed from the lubricating gap through the mixing conduit into the decompression chamber by a gas stream.

As shown in the preferred embodiment, the plain bearing has a plurality of fixed gliding planes 26, 28 arranged successively in a direction of rotation of the rotating shaft, and fresh, cold lubricant is supplied under pressure from pressure chamber 20 to downstream lubricating gap 27 between fixed gliding plane 26 and the rotating shaft.

Preferably, the pressure in pressure chamber 20 and in decompression chamber 22 are separately monitored, and the monitored value of the pressures is fed to a control unit controlling the lubricant pressure in the pressure chamber. Furthermore, the thickness of the lubricating gap may also be monitored, and the monitored value of the pressures is fed to a control unit and the monitored value of the lubricating gap thickness is fed to a dosing unit, the control and dosing units controlling the lubricant pressure in the pressure chamber.

Figure 4:
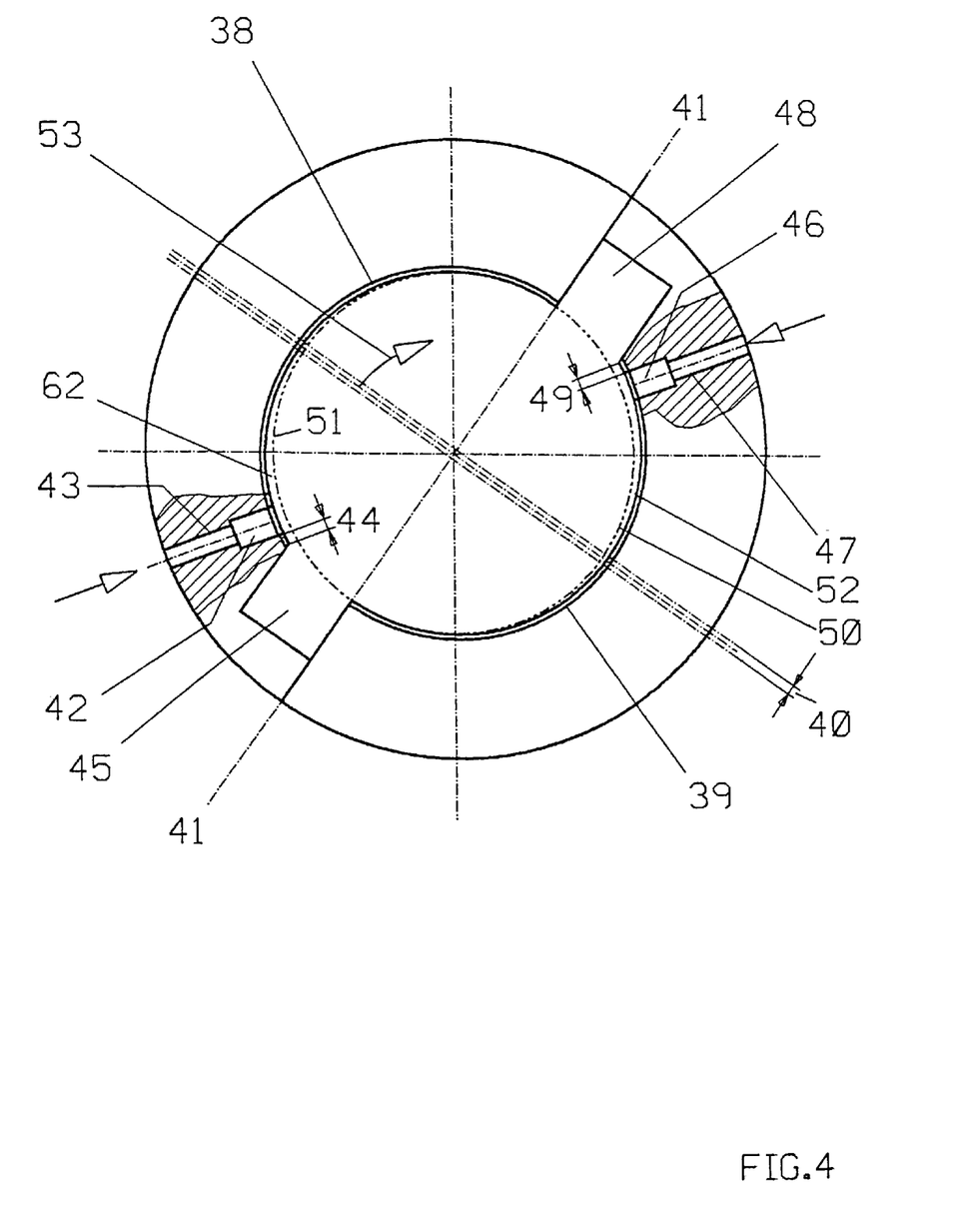
FIG. 4 is an end view, partly in cross section, of an offset-half plain bearing, with two gliding planes, according to one embodiment of the invention.

FIG. 4 illustrates a plain bearing for rotating shaft 50, with an offset structure, which comprises two fixed gliding planes 38, 39, the gliding planes being offset by distance 40 relative to line 41. Means is provided for supplying a fresh, cold lubricant under pressure to the plain bearing, and for removing used, hot lubricant from the plain bearing. The lubricant supplying and removing means comprises a respective pressure chamber 42, 46 upstream of each fixed gliding plane 38, 39 in a direction of rotation of the rotating shaft, indicated by arrow 53, a respective decompression chamber 45, 48 upstream of each pressure chamber in the direction of rotation, a respective mixing conduit 44, 49 connecting the respective pressure and decompression chambers, and a respective bore 43, 47 respectively connecting pressure chambers 42, 46 to a supply of lubricant under pressure. As shown, the pressure chambers are throttled on all sides and the decompression chambers are open and not throttled on at least one side facing the associated fixed gliding planes.

The offset positioning of gliding planes 38, 39 produces an arcuate lubricating gap 62 between circumference 51 of shaft 50 and the gliding planes, which is tapered in the direction of rotation from the pressure chamber associated with one gliding plane to the decompression chamber associated with the other gliding plane.

Figure 5:
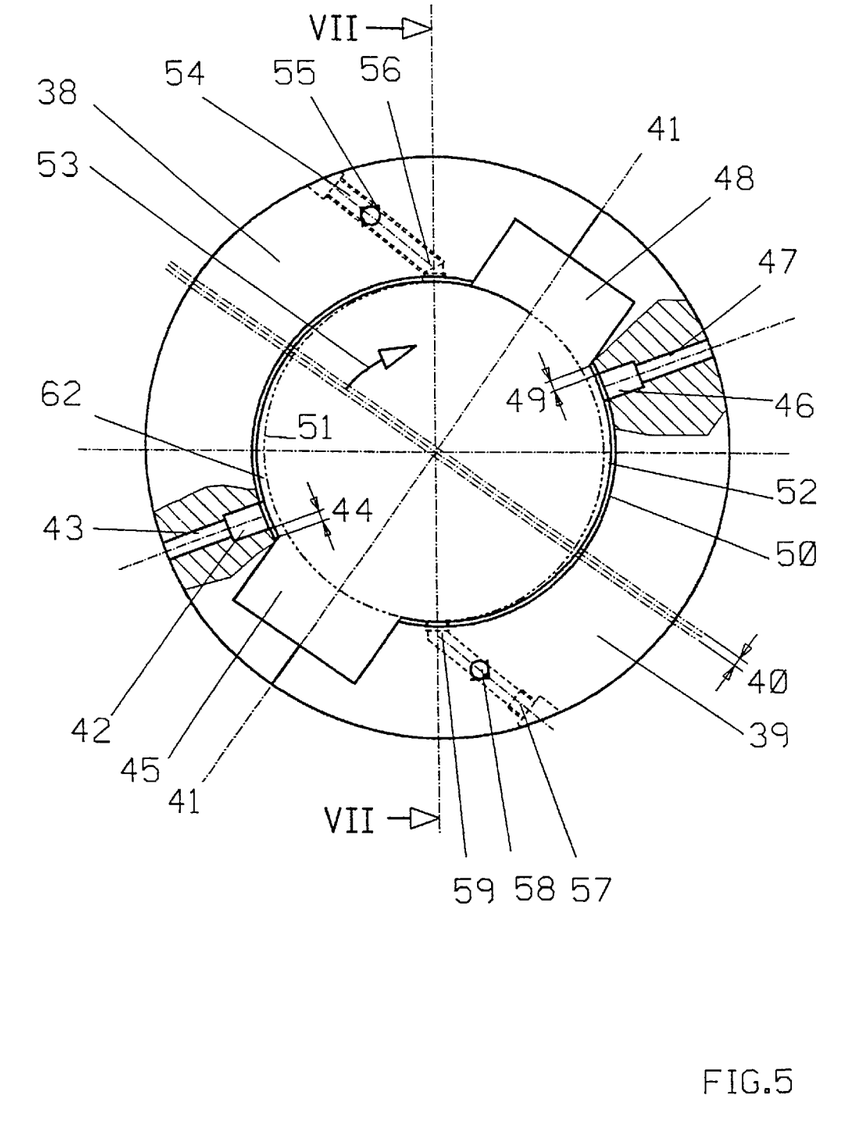
FIG. 5 is a like view, showing a variation of the embodiment of FIG. 4.

The embodiment shown in FIG. 5 differs from that of FIG. 4 only by the provision of an additional pressure chamber 56, 59 associated with gliding plain 38, 39, respectively. A conduit 54, 57 leads to a respective one of the gliding planes for supplying fresh, cold lubricant thereto, a check valve 55, 58 being arranged in a respective one of the conduits to assure a properly directed lubricant flow during normal operation. This arrangement is provided to operate in case of a malfunction if the shaft reverses its rotational direction.

In this embodiment, it may be useful to make the lubricant gap only partly convergent, with the other part being divergent, to produce a smoother rotation in a reverse direction, i.e. counter-clockwise.

Figure 6:
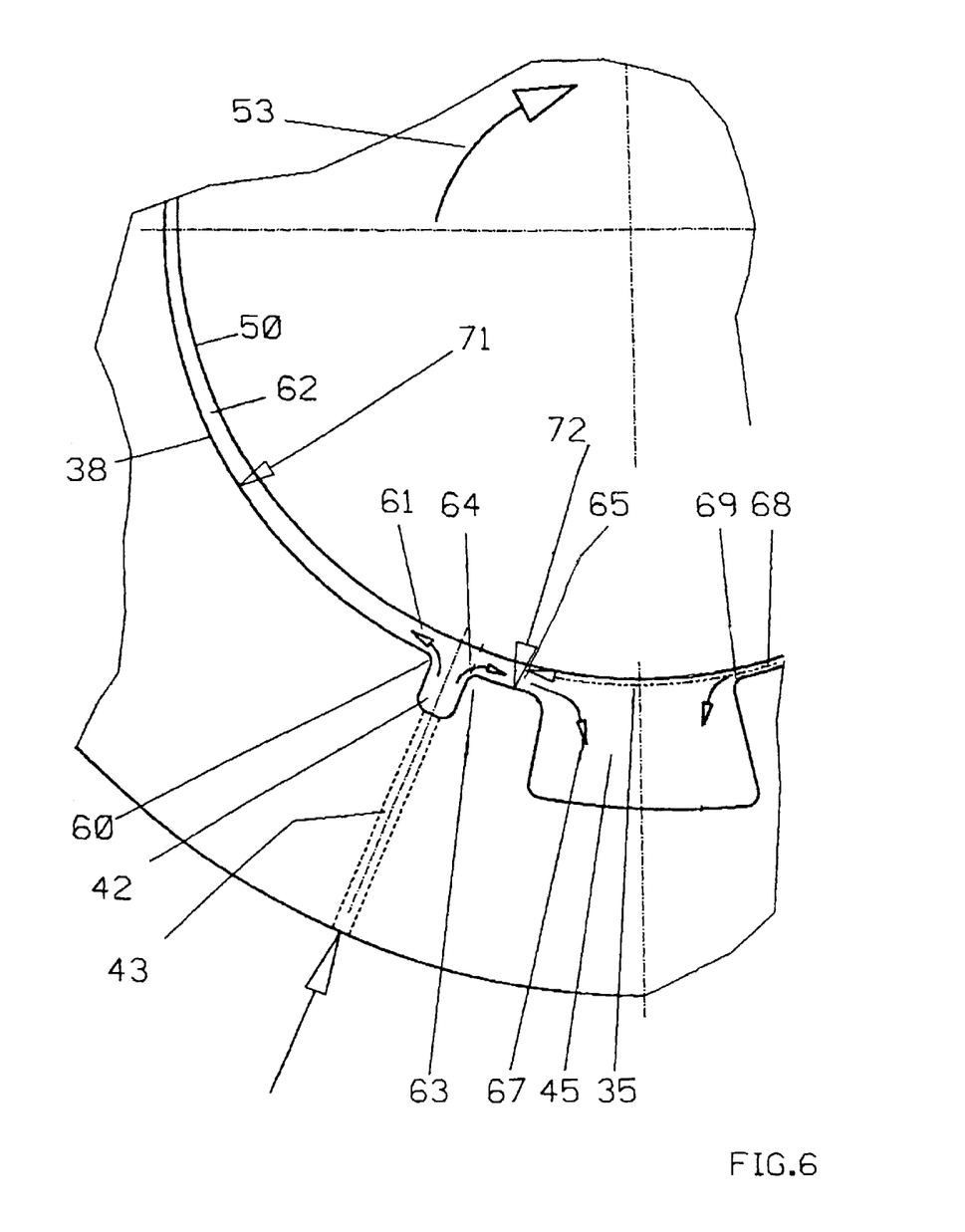
FIG. 6 is an enlarged fragmentary view showing details of the embodiment of FIG. 4 and illustrating the principle of the lubricating method.

As is clear from FIG. 6, fresh, cold lubricant is supplied under pressure through conduit 43 into pressure chamber 42 during rotation of shaft 50 in the direction of arrow 53. A portion of the lubricant flows over transition zone 60 in the direction of arrow 61 into wedge-shaped lubricant gap 62 while another lubricant portion is pumped over transition zone 63 in the direction of arrow 64 into mixing conduit 65 whence it flows in the direction of arrow 67 into decompression chamber 45. The fresh, cold lubricant is mixed in mixing conduit 65 with a portion of used, hot lubricant adhering to the rotating shaft and carried by the rotating shaft in the direction of arrow 35 into the mixing conduit from upstream lubricating gap 68 while another portion of the used, hot lubricant flows over transition zone 69 into decompression chamber 45. The decompression chamber is connected pressurelessly to an oil tank, as shown in FIG. 3. The two lateral openings of the decompression chamber are positioned in the connection between decompression chamber 45 and the oil tank. At least one side of the decompression chamber must be connected with the tank unthrottled to assure a pressureless return of the lubricant.

With this arrangement, mainly fresh lubricant of the desired temperature enters lubricating gap 62, and a desired portion of the used lubricant adhering to the rotating shaft in lubricating gap 68 flows into decompression chamber 45 whence it is discharged into the tank. No undesirable portion of the used, hot lubricant reaches lubricant gap 62 so that the temperature is not undesirably raised at this point of the bearing.

While the surface contour 71 of gliding plane 38 usually differs from surface contour 72 of mixing conduit 65, these surface contours may be the same, i.e. they may have the same radius.

Figure 7:
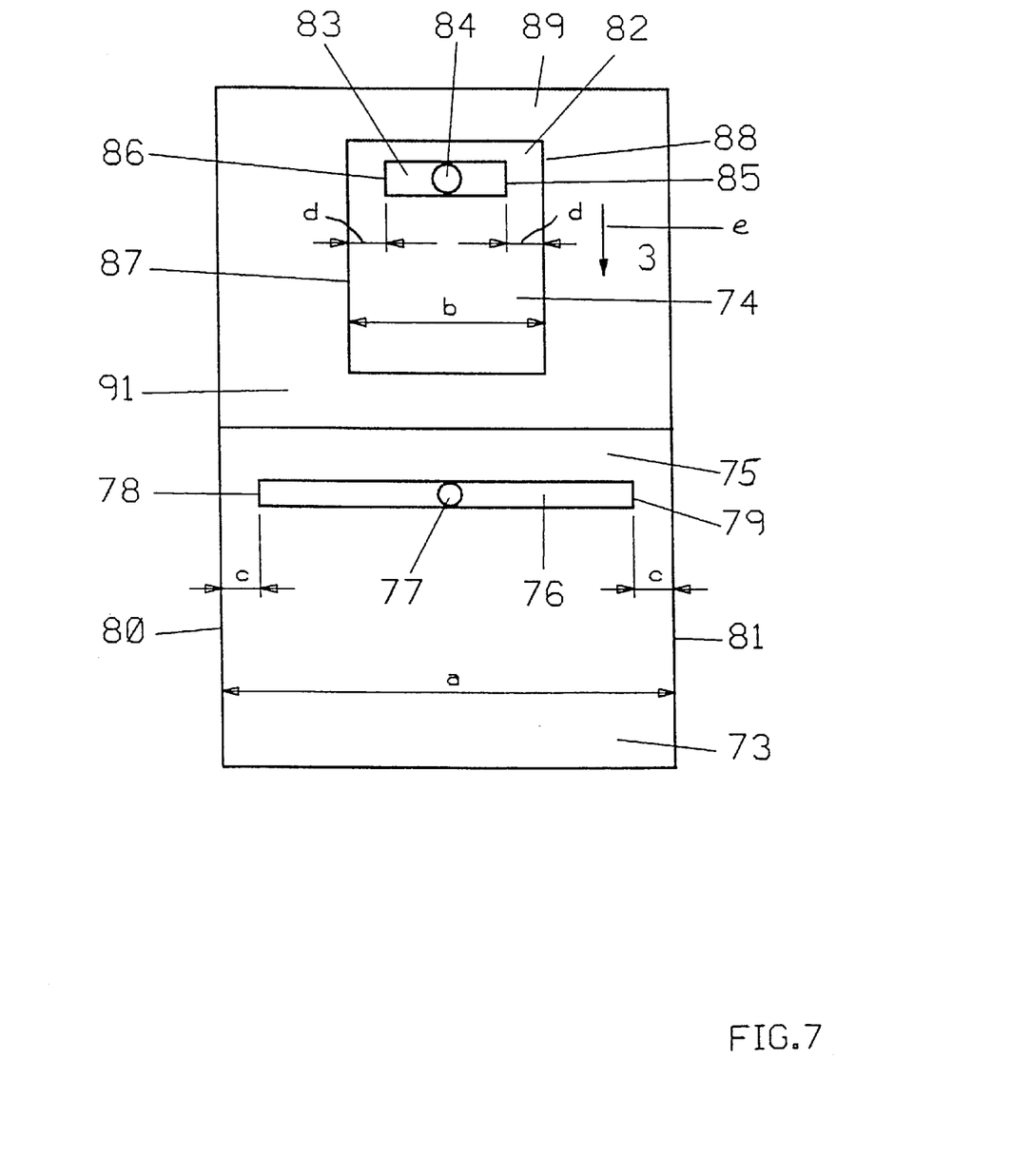
FIG. 7 shows a development of a radial bearing of FIG. 4, viewed from inside of the gliding plane.

FIG. 7 shows a development of the inside plane of a radial bearing with gliding planes 73, 74 of different breadths, gliding plane having breadth a and gliding plane 74 having breadth b. Pressure chamber 76 is associated with gliding plane 73, and fresh lubricant is fed thereto through conduit 77. Pressure chamber 83 is associated with gliding plane 74, and fresh lubricant is fed thereto through conduit 84. Distances c are maintained between ends 78, 79 of pressure chamber 76 and sides 80 and 81 of gliding plane 73, and instances d are maintained between ends 85, 86 of pressure chamber 83 and sides 87 and 88 of gliding plane 74.

In direction e of the shaft, the bearing has decompression chamber 89 predominantly filled with gas and mixing conduit 82 connecting the decompression chamber to pressure chamber 83, associated with gliding plane 74, and decompression chamber 91 predominantly filled with gas connecting this decompression chamber to pressure chamber 76, associated with gliding plane 73.

With this arrangement, the surface areas of the bearing shell and of the shaft, which have to be lubricated, are considerably reduced, which reduces the amount of lubricant required and also reduces the friction losses.

Figure 8:
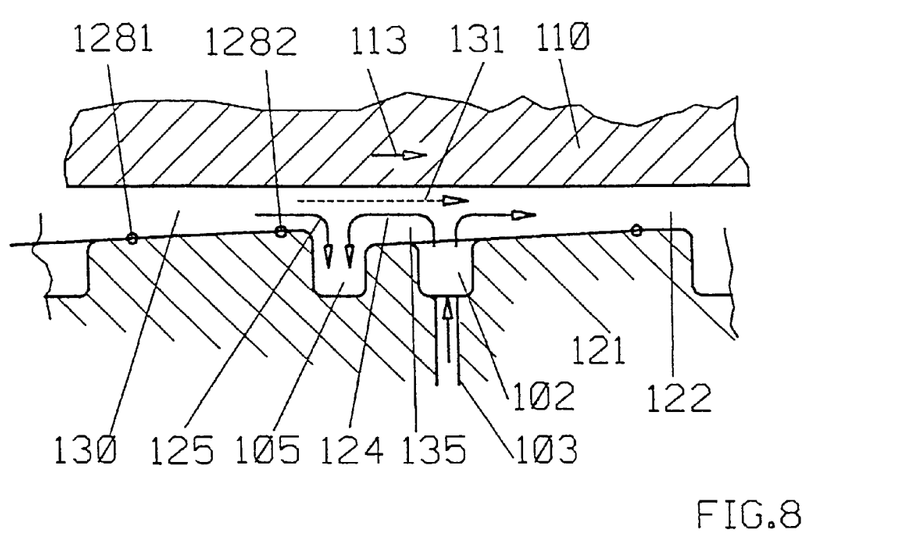
FIG. 8 is a cross section showing a detail of the axial bearing shown in FIG. 9, taken along line VIII—VIII of FIG. 9.
Figure 9:
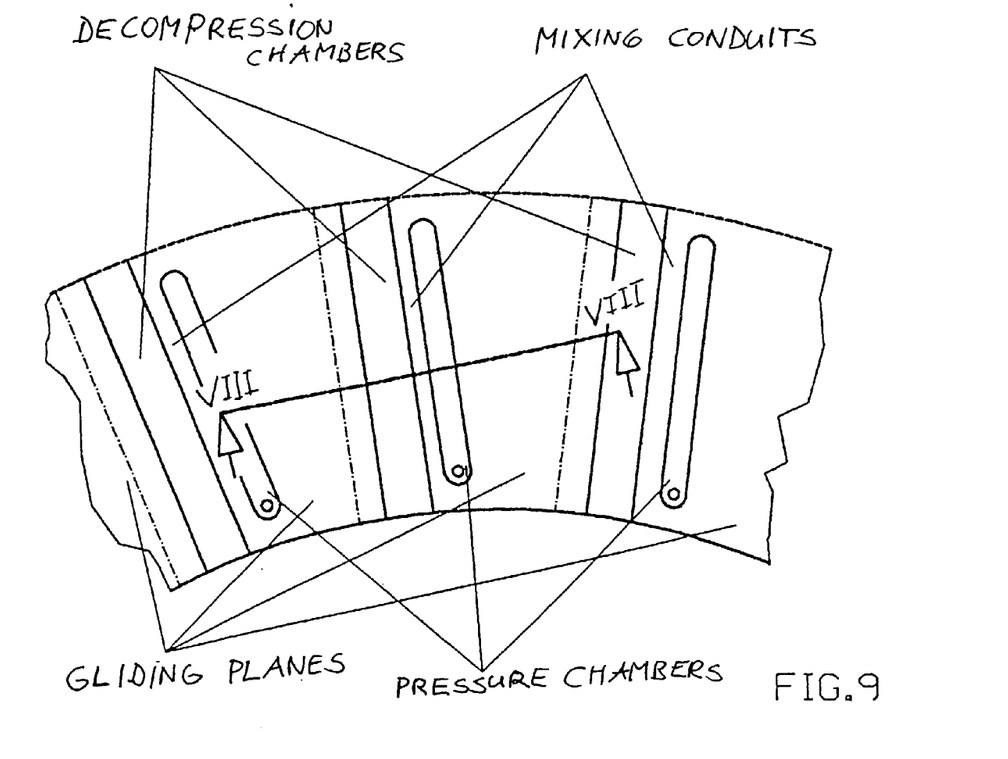
FIG. 9 is a fragmentary top view of an axial bearing.

FIGS. 8 and 9 illustrate an axial bearing for a pressure disc 110 (not shown in FIG. 9) rotating in the direction indicated by arrow 113. As shown in FIG. 9, the bearing has a plurality of successively arranged gliding planes, each of which is associated with a decompression chamber, a pressure chamber and a mixing conduit connecting the chambers.

Referring to FIG. 8, a gliding plane comprised of wedge portion 1281 and rest portion 1282 is succeeded, in direction of rotation 113, by decompression chamber 105, mixing conduit 135 and pressure chamber 102. During the rotation of pressure disc 110, fresh, cold lubricant is pumped into the pressure chamber through conduit 103 whence a portion thereof flows into lubricating gap 122 in the direction of arrow 121. Another portion of the lubricant is pressed in the direction of arrow 124 into mixing conduit 135 whence it flows into decompression chamber 105. This portion of the fresh, cold lubricant is mixed in the mixing conduit with the used, hot lubricant adhering to the rotating disc, which carries this used lubricant in the direction indicated by arrow 131 and flows into the decompression chamber in the direction of arrow 125.

This arrangement assures that mainly fresh lubricant of a desired temperature enters into lubricating gap 122 and that a desired amount of used lubricant flows from lubricating gap 130 into decompression chamber 105 whence it flows into a tank connected thereto. At any rate, no undesirable amounts of used, hot lubricant can reach lubricating gap 122 to raise the temperature there to an undesirable degree.

Figure 10:
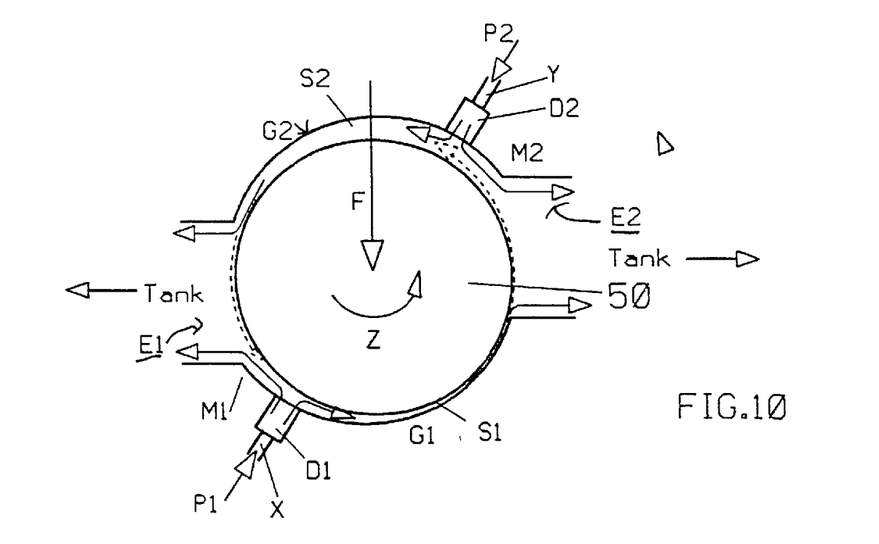
FIG. 10 shows a radial bearing with two gliding planes, similarly to FIG. 4.
Figure 11:
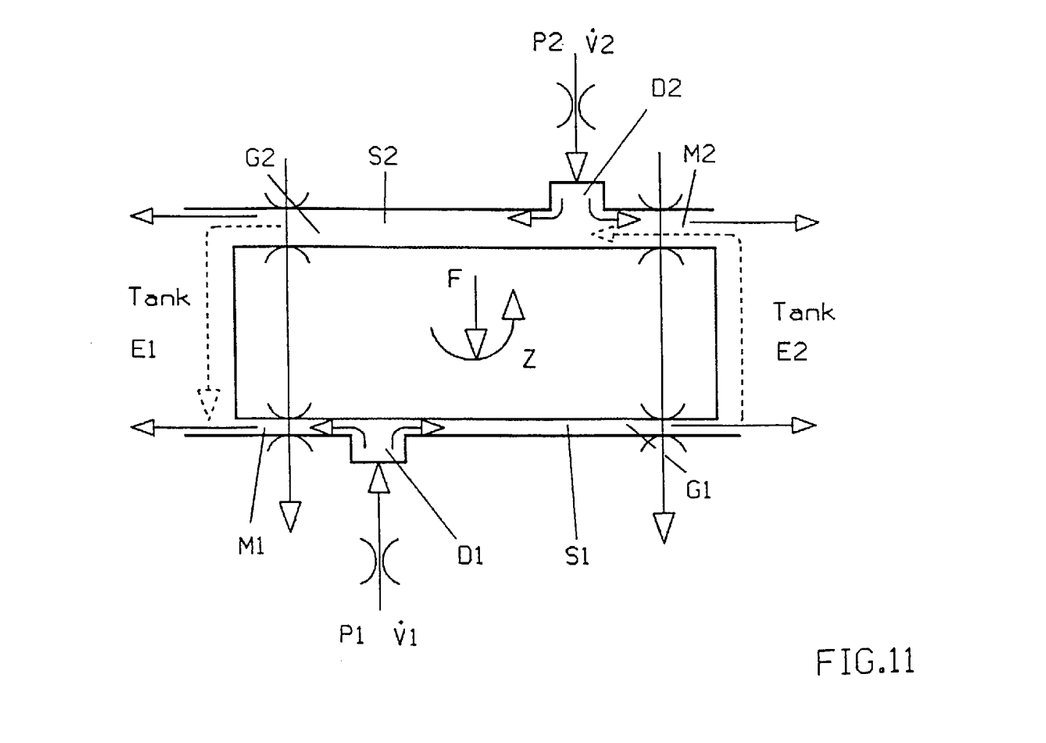
FIG. 11 diagrammatically illustrates the lubricating method applied to the radial bearing of FIG. 10.

FIGS. 10 and 11 illustrate the structure and operation, respectively, of a radial bearing with a lower and an upper gliding plane, thus duplicating the arrangement shown in FIG. 6. Lower gliding plane G1 has lower pressure chamber D1 and a lower mixing conduit M1 connecting lower decompression chamber E1 to the lower pressure chamber, the lower gliding plane defining lubricating gap S1 with a circumference of shaft 50 rotating in a direction of rotation indicated by arrow Z. Upper gliding plane G2 has upper pressure chamber D2 and an upper mixing conduit M2 connecting upper decompression chamber E2 to the upper pressure chamber, the upper gliding plane defining lubricating gap S2 with a circumference of shaft 50 rotating in a direction of rotation indicated by arrow Z. Lubricant from the decompression chambers flows into a tank connected thereto. Throttled conduits X and Y respectively supply fresh, cold lubricant to the lower and upper pressure chambers under respective pressures P1 and P2.

Upon applying a downward force F to the shaft, the shaft approaches lower gliding plane G1, which reduces the dimensions of lubricating gap S1 and lower mixing conduit M1. This means that, with pressure P1 remaining constant, the pressure in the lubricating gap and the lower mixing conduit increases. This, in turn, will lead to an intensive mixing of the fresh and used lubricants in the lower mixing conduit and a proper discharge of the mixture into the lower decompression chamber. At the upper gliding plane G2, the operating conditions are reversed. The dimensions of lubricating gap S2 and upper mixing conduit M2 are increased so that the pressure therein decreases. This reduces the wiping of the used lubricant off the rotating shaft and correspondingly increases the temperature in upper lubricating gap S2. This is desirable since it reduces losses while the higher temperature at the upper gliding plane, which is removed from the rotating shaft, is not objectionable. This condition is schematically shown in FIG. 11 where upper lubricating gap S2 is wider than lower lubricating gap S1.

Figure 12:
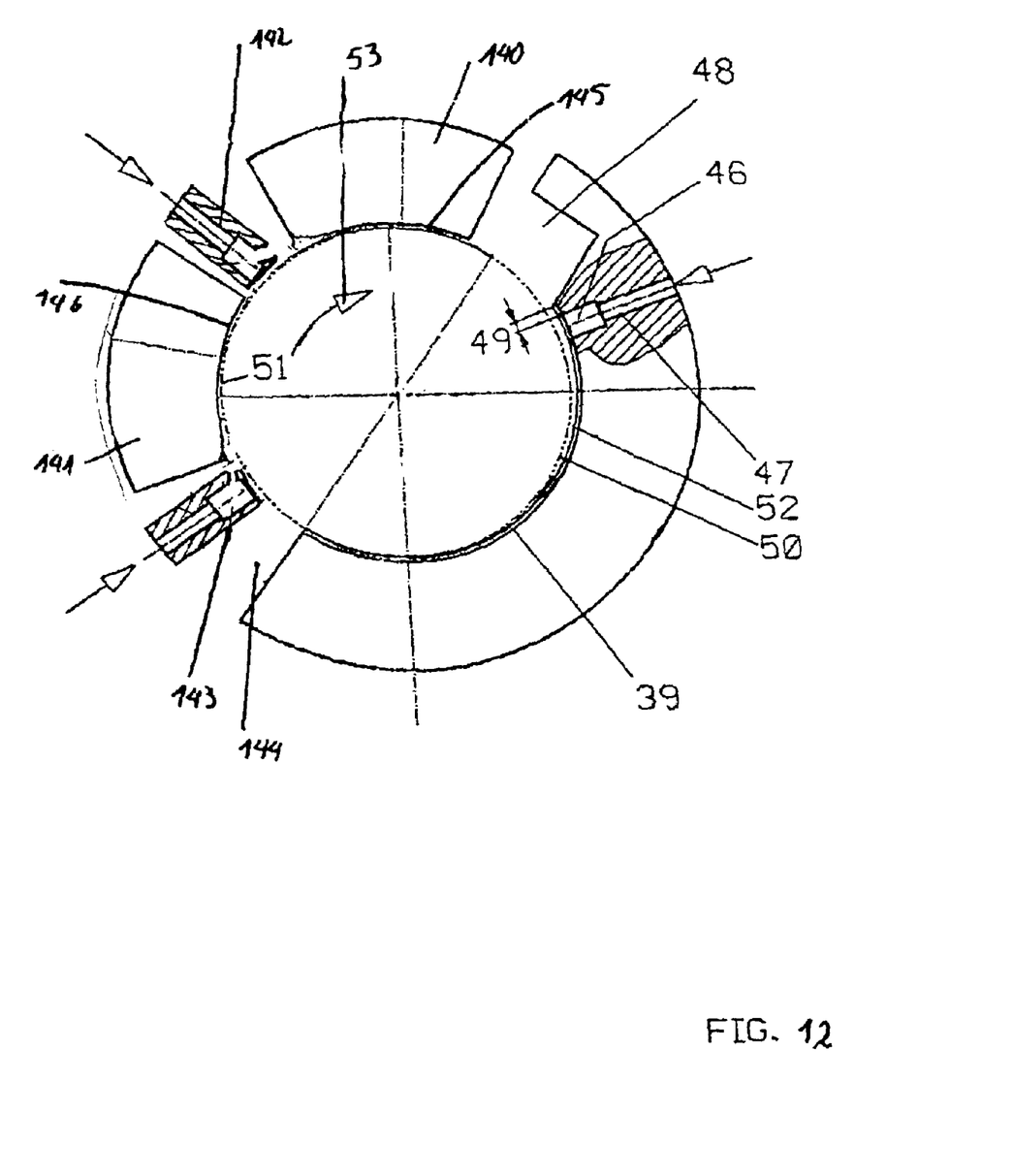
FIG. 12 is an end view, partly in cross section, similar to FIG. 4, of a pivot bearing with two pivoted segments.

The pivot bearing shown in FIG. 12 comprises fixed gliding plane 39 and two pivoted segments 140 and 141. Pressure chamber 46 communicates with gliding plane 39, and lubricant is supplied to the pressure chamber through conduit 47. Mixing conduit 49 and gas-filled decompression chamber 48 are provided upstream of the fixed gliding plane in the direction of rotation 53 of rotating element 50 having a circumference 51, and decompression chamber 144 is provided downstream of the fixed gliding plane. Gliding planes 145 and 146 of the pivoted segments are located opposite fixed gliding plane 39. Nozzles 142 and 143 supply lubricant to pivoted segments 140 and 141 from a supply of lubricant (not shown).

What is claimed is:

1. A method of lubricating and cooling a hydrodynamic plain bearing for a rotating element, which bearing has at least one fixed gliding plane, which comprises the steps of
   (a) supplying fresh, cool liquid lubricant under pressure from a pressure chamber arranged upstream of the gliding plane to a lubricating gap between the fixed gliding plane and the rotating element, where the rotating element glides on the gliding plane, the supply of fresh, cold lubricant being so controlled that an effective lubricating wedge is formed between the rotating element and the fixed gliding plane,
   (b) connecting the pressure chamber and a decompression chamber predominantly filled with gas and arranged upstream of the pressure chamber by a mixing conduit,
   (c) moving used, hot lubricant adhering to the rotating element to the decompression chamber, and
   (d) removing a portion of the used, hot lubricant from the decompression chamber while the remaining portion of the used, hot lubricant flows from the decompression chamber into the mixing conduit and is mixed with fresh, cold lubricant flowing countercurrently in the mixing conduit whence the mixture is pressed into the decompression chamber.

2. The method of claim 1, wherein fresh, cold lubricant is pressed from the mixing conduit into the decompression chamber.

3. The method of claim 1, comprising the further step of exhausting the lubricant removed from the lubricating gap through the mixing conduit into the decompression chamber.

4. The method of claim 1, comprising the further step of removing the lubricant removed from the lubricating gap through the mixing conduit into the decompression chamber by a gas stream.

5. The method of claim 1, wherein the plain bearing has a plurality of fixed gliding planes arranged successively in a direction of rotation of the rotating element, and fresh, cold lubricant is supplied under pressure from a pressure chamber to an downstream lubricating gap between the fixed gliding plane and the rotating element.

6. The method of claim 5, comprising the further step of controlling the amount of mixed lubricant upstream of each fixed gliding plane relative to the direction of rotation is controlled in a self-regulating system by the positioning of the rotating element in the plain bearing.

7. The method of claim 1, comprising the further steps of separately monitoring the pressure in the pressure chamber and in the decompression chamber, and feeding the monitored value of the pressures to a control unit controlling the lubricant pressure in the pressure chamber.

8. The method of claim 1, comprising the further steps of separately monitoring the pressure in the pressure chamber and in the decompression chamber, as well as the thickness of the lubricating gap, and feeding the monitored value of the pressures to a control unit and the monitored value of the lubricating gap thickness to a dosing unit, the control and dosing units controlling the lubricant pressure in the pressure chamber.

9. A plain bearing for a rotating element, which comprises
  (a) at least one fixed gliding plane,
  (b) means for supplying a fresh, cool liquid lubricant under pressure to the plain bearing, and
  (c) means for removing used, hot lubricant from the plain bearing,
    (1) the lubricant supplying and removing means comprising a pressure chamber upstream of the fixed gliding plane in a direction of rotation of the rotating element, a decompression chamber predominantly filled with gas and arranged upstream of the pressure chamber in the direction of rotation, a portion of the used, hot lubricant being removed from the decompression chamber, a mixing conduit connecting the pressure and decompression chambers, and a bore connecting the pressure chamber to a supply of lubricant under pressure.

10. The plain bearing of claim 9, wherein the pressure chamber is throttled on all sides and the decompression chamber is unthrottled on at least one side facing the fixed gliding plane.

11. The plain bearing of claim 9, further comprising a pressureless tank connected to the decompression chamber.

12. The plain bearing of claim 9, further comprising suction means for removing any lubricant from the decompression chamber.

13. The plain bearing of claim 9, further comprising means for generating a gas stream for removing any lubricant from the decompression chamber.

14. The plain bearing of claim 9, which is a radial bearing.

15. The plain bearing of claim 9, which is an axial bearing.

16. The plain bearing of claim 9, which is a pivot bearing comprising the fixed gliding plane and at least two pivoted segments.

* * * * *